United States Patent [19]

Puetz

[11] 3,732,516

[45] May 8, 1973

[54] COMPACT CARTRIDGE-TYPE FUSE HOLDER

[75] Inventor: Jordan F. Puetz, Milwaukee, Wis.

[73] Assignee: Square D Company, Park Ridge, Ill.

[22] Filed: Nov. 8, 1971

[21] Appl. No.: 196,342

[52] U.S. Cl. ................................337/194, 337/213
[51] Int. Cl. .............................................H01h 85/02
[58] Field of Search......................337/186, 187, 188, 337/194, 195, 196, 201, 207, 208, 204, 213, 214; 200/16 B, 16 E

[56] References Cited

UNITED STATES PATENTS

| 633,577 | 9/1899 | Downes................................337/194 |
| 1,123,758 | 1/1915 | Knoblock............................200/16 B |
| 3,432,789 | 3/1969 | Poehlman, Jr.....................337/201 X |
| 1,966,716 | 7/1934 | Green.................................337/194 |

FOREIGN PATENTS OR APPLICATIONS

| 121,920 | 6/1948 | Sweden................................337/194 |
| 832,789 | 4/1960 | Great Britain.......................337/187 |

Primary Examiner—Bernard A. Gilheany
Assistant Examiner—F. E. Bell
Attorney—Harold J. Rathbun et al.

[57] ABSTRACT

A compact cartridge-type fuse holder assembly which is particularly adapted to be mounted adjacent a side wall of an electromagnetic device. The assembly includes a receptacle and an insulating holder which positions one or two cartridge type fuses in the receptacle so the axes of the fuses extend perpendicular to a base of the receptacle. Electrical contact with terminal portions of the fuse is made by fingers positioned within the receptacle. The fingers are electrically connected to wire connecting terminals located externally on the molded housing for the receptacle.

12 Claims, 4 Drawing Figures

PATENTED MAY 8 1973 3,732,516
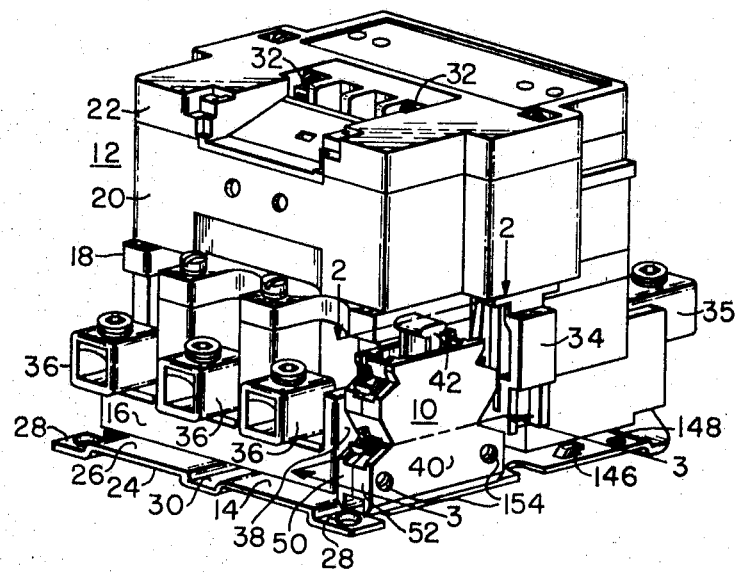
FIG. 1
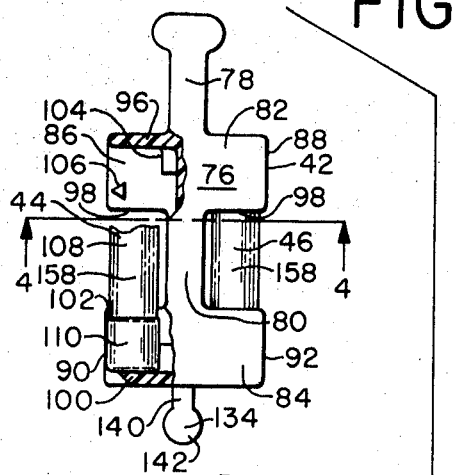
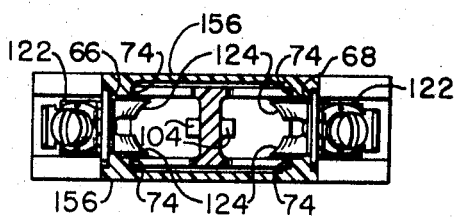
FIG. 3
FIG. 4
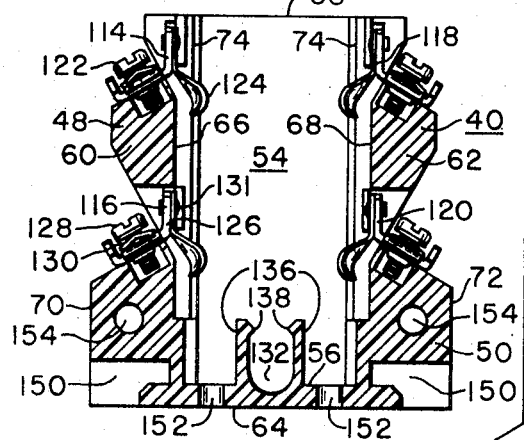
FIG. 2
INVENTOR.
JORDAN F. PUETZ
BY
William H. Schmelzing

COMPACT CARTRIDGE-TYPE FUSE HOLDER

Electromagnetic devices known as contactors and starters are frequently used in circuits, known as branch circuits, which control the energization of an electric load such as an electric motor. The devices include contacts which are moved to a circuit closing position by an electromagnet. The electromagnet includes a magnet coil, which when energized, causes the electromagnet to become operative and the contacts of the device to move to a circuit closing position. Conventionally, the branch circuits are protected by overcurrent devices which will interrupt the circuit whenever an excess current flows through the circuit. These overcurrent devices may include fuses and circuit breakers. Additionally, the magnet coil is connected in a circuit known as a control circuit which is controlled by remotely located switching devices and energized by currents flowing through the overcurrent devices.

The present 1971 National Electric Code permits a control circuit to be unfused, providing the branch circuit overcurrent device is not more than 500 percent of the capacity of the control circuit conductors which may exceed the interrupting capacity of the switching devices used in the control circuits. Thus while it is desirable that fuses be used in all control circuits, frequently they are omitted because of the inconveniences in wiring and the lack of excess space within the enclosures for the electromagnetic devices when an attempt is made to incorporate fuses positioned by conventional fuse holders in the control circuit.

It is an object of the present invention to provide a fuse holder assembly which is small, compact and capable of being conveniently installed in a control circuit for an electromagnetic device.

Another object is to provide a fuse holder assembly which is small, compact, and arranged so that it may be conveniently mounted adjacent an electromagnetic device to provide fused protection for the control circuit for the device.

An additional object is to provide a fuse holder assembly that has a novel configuration and may be conveniently mounted adjacent an electromagnetic device to protect the control circuits for the device against excess currents and safely inspected while the control circuit is connected to an electric source.

Further objects and features of the invention will be readily apparent to those skilled in the art from the following specification and from the appended drawing illustrating certain preferred embodiments, in which:

FIG. 1 is a perspective view illustrating the manner in which a fuse holder according to the present invention may be combined with an electromagnetic device;

FIG. 2 is a view of the fuse holder assembly in FIG. 1 with the holder for the fuses detached from the fuse holder housing and showing the housing in cross section as taken along line 2—2 in FIG. 1 and with portions of the holder broken away to illustrate means on the holder for positioning a fuse;

FIG. 3 is a view taken along line 3—3 in FIG. 1 with the fuses within the fuse holder assembly removed; and FIG. 4 is a view taken along line 4—4 in FIG. 2 with the fuses removed from the assembly.

Referring to the drawings, and particularly to FIG. 1, a fuse holder assembly 10 is shown as mounted adjacent a side wall of an electromagnetic switch 12. The electromagnetic switch 12, while not constituting a feature of the present invention, is included in the drawing to illustrate a manner in which the assembly 10 may be used and is fully described in the U.S. Pat. No. 3,553,615, which was granted on Jan. 5, 1971 to Merlin Y. Turnbull.

The switch 12 has a plurality of components stacked upon each other that include a metal mounting plate 14, an insulating base 16, an insulating barrier 18, a metal housing 20 and cover 22. The metal mounting plate 14 is formed of a stamped metal part and provides a means to secure the switch 12 to a vertical panel and the like, not shown. When the plate 12 is secured to a panel, an edge 24 becomes a bottom edge of the plate 22 and a surface 26 the front surface of the plate 14. The plate 14 has a pair of rearwardly extending indentations 28 along its bottom edge 24 providing a pair of spaced mounting feet having openings therein. The plate 14 also has an indentation, not shown, that extends across its top edge which provides an elongated mounting foot having an opening therein. The mounting feet with the openings therein are provided for the purpose of securing the plate 14 to a vertical panel. The plate 14 also includes an indentation 30 which extends from the bottom edge 24 rearwardly in the front surface 26 to the top edge. The indentation 30 acts as a wire trough and is provided to permit passage of control wires from the upper to the lower ends of the switch 12.

Positioned within the housing 20 is a magnet motor, not shown, that includes a coil having a winding connected to a pair of terminals 32. The magnet motor, when energized, causes a member 34 carrying movable contacts to engage stationary contacts within compartments provided by the base 16 and the barrier 18 to complete circuits between three wire connecting terminals 35 at the top side of the switch 12 and three wire connecting terminals 36 at the lower side of the switch 12. While as shown in FIG. 1, the fuse holder assembly 10 is shown as mounted adjacent a side wall 38 at the lower right corner of the switch 12, it is apparent the assembly 10 may be mounted at any of the remaining three corners of the switch 12.

The fuse holder assembly includes a receptacle 40 and removable holder 42 for a pair of fuses 44 and 46. The receptacle 40 includes a housing 48 which is formed of a pair of molded insulating parts 50 and 52 which are identical and mated and secured together to provide a substantially rectangular socket 54. In the preferred embodiment, the parts 50 and 52 are molded of transparent material so the fuses 44 and 46 are visible externally of the housing 48. The housing 48 has a rear wall 56 which provides the socket 54 with a closed rear end and is formed so the socket 54 has an open front end 58 which provides an entryway for the fuse holder 42. A pair of side walls 60 and 62 extending from the front end 58 to a rear end 64 on the housing 48 respectively provide the socket with a pair of confronting side walls 66 and 68 and the housing 48 with a pair of oppositely facing external walls 70 and 72. Extending from front to rear at each of the four corners of the socket 54 is a guide rib 74 which serves to position the fuse holder 42 within the socket 54.

The fuse holder 42 is formed as a unitary body of molded insulating material to have a body portion 76 and a finger-grip portion 78. The finger-grip portion 78 extends forwardly from the body portion 76 and is externally accessible of the front end 58 when the body portion 76 is positioned within the socket 54. The finger-grip portion 78 is provided so that a manual force applied to the finger-grip portion 78 along an axis normal to the rear end 64 will cause the body portion 76 to be removed from the socket 54.

The body portion 76 is substantially rectangular in shape and includes a stem portion 80 and an arm portion 82 at a forward end and an arm portion 84 at a rearward end of the stem portion 80. The arm portion 82 extends from opposite sides of the stem portion 80 to provide a pair of rearwardly facing recesses 86 and 88 on opposite sides of the stem portion 80 at the front end of the body portion 76, as shown in FIG. 4. Similarly, the arm portion 84 extends from opposite sides of the stem portion 80 to provide a pair of forwardly facing recesses 90 and 92 on opposite sides of the stem portion at the rear end of the body portion 76. The recesses 86-92 are identical and merely differ in their orientation relative to the stem portion 80. Each of the recesses 86-92 includes a pair of side walls 94 which are capable of being flexed. The recesses 86 and 88 have a wall 96 closing their upper ends and an open bottom side 98, as illustrated by FIG. 2. The recesses 90 and 92 have a wall 100 closing their lower ends and an open upper side 102. Projecting into each of the recesses 86-92 is an individual abutment 104 and extending into each recess 86-92 from each of their associated side walls 94 is a nib 106.

The recesses 88-92 on the fuse holder 42 are constructed to position the fuses 44 and 46 within the socket 54. The fuses 44 and 46 are identical and of the cartridge-type, each having a cylindrical body 108 and cylindrical terminal portions 110 at opposite ends of the body 108 which form cylindrical extensions of the body 108 and extend along the axis of the cylindrical body 108. The fuse 44 is installed in the recesses 86 and 90 by passing the fuse 44 through an opening between the side walls 94 of the associated recesses 86 and 90 to a position wherein the terminal portions 110 at the opposite ends of the fuse 44 are positioned against the abutments 104 in the respective recesses 86 and 90. During the passage of the terminal portions 110 to their respective positions within the recesses 86 and 90, the walls 94 of the associated recess will flex to permit the terminal portions 110 to pass over the nibs 106. When terminal portions 110 are positioned on the abutments 104, the nibs 106 will engage surface portions on the cylindrical terminal portions 110 to resiliently maintain the fuse 44 in its proper position within the fuse holder 42. The walls 96 and 100 of the recesses 86 and 90 respectively are provided to engage the free ends on the terminal portions 110 and prevent the fuse 44 from being axially displaced in the fuse holder 42. Similarly, the fuse 46 is installed in the recesses 88 and 92 by passing the terminal portions 110 on the fuse 46 through the opening between the side walls 94 of the associated recesses 88 and 92 to a position wherein the terminal portions 110 at the opposite ends of the fuse 46 are positioned against abutments 104 in the associated recesses 88 and 92. During the passage of the terminal portions 110 on the fuse to its position within the recesses 88 and 92, the walls of the associated recesses 88 and 92 will flex to permit the terminal portions 110 to pass over the nibs 106. When the terminal portions 110 are positioned on the abutments 104, the nibs 106 will engage surface portions on the cylindrical terminal portions 110 to resiliently maintain the fuse 46 in its proper position within the fuse holder 42. The walls 96 and 100 of the recesses 90 and 86 respectively are provided to engage the free ends on the terminal portions 110 and prevent the fuse 46 from being axially displaced in the fuse holder 42.

The fuse holder 42, when positioned in the socket 54, will position the fuses 44 and 46 so that the terminal portions 110 on the fuse 44 will have a surface exposed and facing the side wall 66 and surface portions on the terminal portions 110 on the fuse 46 will be exposed and face the side wall 68, with the terminal portions 110 on the opposite ends of the fuses 44 and 46 positioned at the front and the rear ends of the socket 54.

The receptacle 40 includes a first pair of terminal assemblies 114 and 116 which are positioned by the wall 66 so the terminal assembly 114 is located adjacent the front end 58 of the socket 54 and the terminal assembly 116 is located adjacent the rear end 64 of the socket 54. The receptacle 40 also includes a second pair of terminal assemblies 118 and 120 which are positioned by the wall 68 so the terminal assemblies 118 and 120 are respectively located adjacent the front and rear ends 58 and 64 of the socket 54. The four terminal assemblies 114-120 are identical and each includes a wire connecting terminal portion 122, located externally of one of the walls 60 or 62, and a pair of spaced contact fingers 124 which are resilient and electrically connected to their associated terminal portions 122 and extend from one of the side walls 66 or 68 into the socket 54 in positions where the spaced fingers 124 tightly engage one of the terminal portions 110. The terminal portions 122 each include a strap 126 that has a threaded opening at one end which receives a terminal screw 128. The screw 128 positions a wire clamp 130. The contact fingers 124 are secured to a portion of the strap 126 by a rivet 131 and are contoured as shown in FIG. 3 to have a maximum area surface engagement with the terminal portions 110.

The fuse assembly 10 also includes a means including a cavity 132 at the rear end 64 of the socket 54 and a projection 134 at the rear end of the fuse holder 42 for maintaining the fuse holder 42 in its fully inserted position within the socket 54.

The cavity 132 is formed by a pair of spaced forwardly extending, slightly resilient walls 136 that extend forwardly from the rear wall 56. The walls 136 have lips 138 at their forward ends which reduce the width of the cavity 132 at its forward end. The projection 134 has a necked portion 140 from which a bulged end 142 extends. The bulged end 142 has a width slightly greater than the space between the lips 138 and is sized to be received in the portion of the cavity 132 spaced rearwardly of the lips 138. The necked portion 140 has a width less than the space between the lips 138.

The fuse holder 42, when fully inserted into the socket 54, will cause the bulged end 142 to be received in the cavity 132 and each of the terminal portions 110 on the fuses 44 and 46 to be engaged by the fingers 124 on one of the terminal assemblies 114-120. Thus the fuse 44 will complete a fused circuit between the terminal assemblies 114 and 116 and the fuse 46 will complete a fused circuit between the terminal assemblies 118 and 120. The fuse holder 42 will be resiliently maintained in its position in the socket 54 by the detachable connection between the projection 134 and the cavity 132. In the preferred embodiment, the terminal assemblies 114–120 are positioned by the side walls 66 and 68 and the cavity 132 and the projection 134 are sized and shaped so that the terminal portions 110 are not engaged by the fingers 124 when the maximum width portion of the bulged end 142 is positioned forwardly of the lips 138. Further, the parts are sized and arranged so that as the maximum width portion of the bulged end 142 passes rearwardly of the lips 138, the resilient walls 136 will cause the bulged end 142 to move fully into the cavity 132 and position the fuse holder 42 at its fully inserted position within the socket 54.

As shown in FIG. 1, the mounting plate 14 is provided with a hook 146 and a threaded opening 148 which are used to mount the fuse holder assembly 10 on the plate 14 in a position whereat the fuse holder is adjacent the side wall 38. The mounting of the fuse holder assembly 10 on the plate 14 is accomplished when the hook 146 is positioned in one of a pair of recesses 150 at the rear end of the housing 48 and passing a mounting screw, not shown, through one of a pair of openings 152 in the rear wall 56. One of the pair of openings 152 will be aligned with the opening 148 when the hook 146 is in one of the pair of recesses 150 so that the mounting screw can be tightened in the opening 148 while the fuse holder 42 is removed from the socket 54. Further, as shown in FIGS. 1 and 2, the housing 22 is provided with a pair of openings 154 which may be used to mount the fuse holder assembly 10 on a panel with one of its side walls 156 positioned adjacent the panel.

The fuse holder as shown in the drawing includes a pair of fuses 44 and 46 which may be used to fuse both sides of a control circuit that is connected to the terminals 32 to protect the control circuit against excess currents which could cause damage to the wires, switching devices and the magnet coil as used in the control circuit. Further, the use of fuses on both sides of the control circuit will maximize the protection against false operation of the electromagnetic device because of accident grounds which may occur in portions of the control circuit in a manner well known to those skilled in the art. While the fuse assembly 10 is shown as having two fuses, if it is desired to fuse only one side of the control circuit, one of the fuses can be eliminated from the fuse assembly and the remaining fuse connected in the series circuit with the terminals 32.

Replacement of the fuses 44 and/or 46 may be readily accomplished while the control circuit is electrically connected to a supply by using the insulating finger-grip portion 78 to remove the fuse holder 42 from the receptacle 40. The removal of the fuses 44 and/or 46 from the fuse holder 42 can be accomplished without tools because of the spaces 158 provided between the spaced arms 82 and 84 on opposite sides of the stem 80 which permit access to the body portion 108 of the fuses 44 and 46 and permit the fuse to be externally visible from the exterior of the fuse holder assembly 10.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What I claim is:

1. A fuse assembly comprising: a cartridge-type fuse having a cylindrical body and terminal portions at the opposite ends of the body, a housing of insulating material, said housing having a rectangular socket extending from an open front end of the housing to a wall at a rear end of the housing which provides the socket with a closed rear end and a pair of walls extending between the front end and the rear end which provide the housing with a pair of oppositely facing external walls and the socket with a pair of spaced confronting side walls, a unitary removable fuse holder formed of insulating material to have a body portion received within the socket and a finger-grip portion extending from the body portion external of the front end of the housing to permit the body portion to be removed from an inserted position within the socket when a manual force is applied to the finger-grip portion along an axis extending normal to the rear end of the socket, said body portion including means for positioning the fuse adjacent one of the pair of side walls of the socket so an axis of the cylindrical body extends normal to the rear end of the socket and the terminal portions at the opposite ends of the cylindrical body are exposed to the said one side wall respectively at the front end and the rear end of the socket when the body portion is fully inserted into the socket to a position whereat a rear end of the body portion is adjacent the rear end of the socket, a contact finger extending from said one side wall into the socket and engaging the terminal portion of the fuse at the front end of the socket when the body portion is at its fully inserted position in the socket, a contact finger extending from the said one side wall into the socket and engaging the terminal portion of the fuse at the rear end of the socket when the body portion is at its fully inserted position in the socket, a wire connecting terminal positioned externally of the housing and electrically connected to the contact finger at the front end of the socket, and a wire connecting terminal positioned externally of the housing and electrically connected to the contact finger at the rear end of the socket.

2. The fuse assembly as recited in claim 1 including means on the rear end of the socket and the rear end of the body portion for releasably maintaining the body portion in its fully inserted position in the socket.

3. The fuse assembly as recited in claim 2 wherein the means includes a cavity in the rear end of the socket and a projection on the rear end of the body portion which is received within the cavity when the body portion is at its fully inserted position within the cavity.

4. The fuse assembly as recited in claim 3 wherein the projection extends from the rear wall of the body a distance to prevent the contact fingers from engaging the terminal portions of the fuse when the holder is moved to a position in the socket whereat the projection is withdrawn from the cavity.

5. The fuse assembly as recited in claim 4 wherein the projection has a bulged end extending from a necked portion and the cavity has a pair of resilient lips at an entrance to the cavity which pass over the bulged end and are adjacent the necked portion when the projection is inserted into the cavity.

6. The fuse assembly comprising: a pair of cartridge-type fuses each having a cylindrical body and terminal portions at the opposite ends of the body extending along an axis, a housing of insulating material, said housing having a rectangular socket extending from an open front end of the housing to a wall at a rear end of the housing which provides the socket with a closed rear end, and a pair of walls extending between the front end and the rear end which provide the housing with a pair of oppositely facing external surfaces and the socket with a pair of spaced confronting side walls, a unitary removable fuse holder formed of insulating material to have a body portion received in the socket and a finger-grip portion extending from the body portion external of the front end of the housing to permit the body portion to be removed from an inserted position within the socket when a manual force is applied to the finger-grip portion along an axis extending normal to the rear end of the socket, said body portion including means for positioning a first of said pair of fuses adjacent a first of said pair of side walls and a second of said pair of fuses adjacent a second of said pair of side walls so that the axes of the first and the second fuses respectively extend normal to the rear end of the socket and a surface portion on the terminal portions at the opposite ends of the fuses are exposed respectively to their associated side walls at the front end and the rear end of the socket when the body portion is fully inserted into the socket into a position whereat a rear end of the body portion is adjacent the rear end of the socket, a first terminal assembly including a wire connecting terminal portion positioned externally of the housing and a pair of spaced contact fingers extending from the first side wall into engagement with the exposed surface on the terminal portion of the first fuse at the front end of the socket, a second terminal assembly including a wire connecting terminal portion positioned externally of the housing and a pair of spaced contact fingers extending from the first side wall into engagement with the exposed surface on the terminal portion of the first fuse at the rear end of the socket, a third terminal assembly including a wire connecting terminal portion positioned externally of the housing and a pair of spaced contact fingers extending from the second side wall into engagement with the exposed surface on the terminal portion of the second fuse at the front end of the socket, and a fourth terminal assembly including a wire connecting terminal portion positioned externally of the housing and a pair of spaced contact fingers extending from the second side wall into engagement with the exposed surface on the terminal portion of the second fuse at the rear end of the socket.

7. The fuse assembly as recited in claim 6 wherein the body portion includes a stem and arm portions extending from the stem to provide a pair of rearwardly facing recesses at the front end of the socket and a pair of forwardly facing recesses at the rear end of the socket with each of said recesses having a terminal portion of one of the pair of fuses positioned therein.

8. The fuse assembly as recited in claim 6 wherein the body portion includes a stem and arm portions extending from the stem to provide a pair of rearwardly facing recesses at the front end of the socket and a pair of forwardly facing recesses at the rear end of the socket and each of said recesses is provided with projections for maintaining a terminal portion of one of the pair of fuses therein.

9. The fuse assembly as recited in claim 8 including means on the rear end of the socket and the rear end of the body portion for releasably maintaining the body portion in its fully inserted position in the socket.

10. The fuse assembly as recited in claim 9 wherein the means includes a cavity in the rear end of the socket and a projection on the rear end of the body portion which is received within the cavity when the body portion is at its fully inserted position within the cavity.

11. The fuse assembly as recited in claim 10 wherein the projection extends from the rear wall of the body a distance to prevent the contact fingers from engaging the terminal portion of the fuse when the holder is moved to a position in the socket whereat the projection is withdrawn from the cavity.

12. The fuse assembly as recited in claim 11 wherein the projection has a bulged end extending from a necked portion and the cavity has a pair of resilient lips at an entrance to the cavity which pass over the bulged end and are adjacent the necked portion when the projection is inserted into the cavity.

* * * * *